US 6,695,940 B2

(12) United States Patent
Devoe et al.

(10) Patent No.: US 6,695,940 B2
(45) Date of Patent: Feb. 24, 2004

(54) LAMINATE THIN-WALL CERAMIC TUBES, INCLUDING WITH INTEGRAL STRESS WRAPPINGS, THICKENED ENDS AND/OR INTERNAL BAFFLES, PARTICULARLY FOR SOLID OXIDE FUEL CELLS

(76) Inventors: Alan D. Devoe, 5715 Waverly Ave., La Jolla, CA (US) 92037; Mary Trinh, 10941 Caminito Arcada, San Diego, CA (US) 92131

( * ) Notice: Subject to any disclaimer, the term of this patent is extended or adjusted under 35 U.S.C. 154(b) by 76 days.

(21) Appl. No.: 09/828,558

(22) Filed: Apr. 5, 2001

(65) Prior Publication Data

US 2002/0146523 A1 Oct. 10, 2002

(51) Int. Cl.$^7$ .............................................. B32B 31/26
(52) U.S. Cl. ................................ 156/89.11; 156/89.12; 156/89.16; 156/184; 156/190; 264/635
(58) Field of Search ........................... 156/89.11, 89.12, 156/89.16, 89.28, 184, 190, 191, 192, 195; 264/635

(56) References Cited

U.S. PATENT DOCUMENTS

| | | | |
|---|---|---|---|
| 4,348,714 A | * | 9/1982 | Wallace |
| 4,475,967 A | * | 10/1984 | Kanai et al. |
| 4,562,124 A | * | 12/1985 | Ruka |
| 4,985,103 A | * | 1/1991 | Kuono et al. |
| 5,108,850 A | * | 4/1992 | Carlson et al. |
| 5,151,660 A | * | 9/1992 | Powers et al. |
| 5,277,995 A | * | 1/1994 | Ruka et al. |
| 5,779,969 A | * | 7/1998 | Chatterjee et al. |

FOREIGN PATENT DOCUMENTS

| | | | |
|---|---|---|---|
| JP | 62-292686 | * | 12/1987 |
| JP | 64-25583 | * | 1/1989 |
| JP | 3-233915 | * | 10/1991 |
| JP | 7-226317 | * | 8/1995 |

OTHER PUBLICATIONS

Henrik Raeder, "Fabrication of thin–walled ceramic tubes by tape casting," Ceramics Today—Tomorrow's Ceramics, Elsevier Science Publishers, 1991, p. 1123–1129.*
"Improved construction of bender element," IBM Technical Disclosure Bulletin, Jun. 1986, vol. 29, pp. 28–31.*

* cited by examiner

Primary Examiner—Curtis Mayes
(74) Attorney, Agent, or Firm—Fuess & Davidenas

(57) ABSTRACT

Very thin cast ceramic tape, preferably approximately 12 $\mu$m in thickness, is wrapped, preferably in a reversing spiral or helix, around a mandrel, preferably a mandrel made of steel and coated with a wax releasing agent, for so many times, preferably five or greater, as achieves a desired thickness of a tube wall, preferably about 100 $\mu$m. The green ceramic tube is then laminated in a pressure laminator, preferably a hydrostatic laminator at 3000 to 5000 psi, linking polymer chains between each ceramic layer, cross-linking polymer chains within each ceramic layer, and densifying the produced ceramic laminate tube by reducing porosity. By varying the wraps, wrapping and/or mandrel surface, high quality thin-wall laminate ceramic tubes having any of (i) external reinforcement windings as enhance burst strength, (ii) thickened end regions as facilitate mounting while reducing breakage, and/or (iii) internal features, including baffles, as desirably induce turbulence in longitudinal gas flow, may all readily be fabricated, including in an automated process.

14 Claims, 1 Drawing Sheet

LAMINATE THIN-WALL CERAMIC TUBES, INCLUDING WITH INTEGRAL STRESS WRAPPINGS, THICKENED ENDS AND/OR INTERNAL BAFFLES, PARTICULARLY FOR SOLID OXIDE FUEL CELLS

BACKGROUND OF THE INVENTION

1. Field of the Invention

The present invention generally concerns (i) the fabrication of thin-walled ceramic tubes, on the order of 1 millimeter to less than 100 micrometers wall thickness and from 20–100 centimeters in length, by a lamination process; and (ii) the laminate thin-wall ceramic tubes so fabricated, including tubes as may optionally be possessed of any of external wrappings/windings, thickened end regions, and/or internal features including baffles.

The present invention particularly concerns the economical automated fabrication of straight, high quality, reliable, strong and optionally feature-laden thin-walled laminate ceramic tubes, and the ceramic tubes so fabricated. The ceramic tubes so fabricated are suitably used in, inter alia, Solid Oxide Fuel Cells (SOFCs).

2. Description of the Prior Art

Ceramic tubes have found a use in the manufacture of Solid Oxide Fuel Cells (SOFCs). There are several types of fuel cells, each offering a different mechanism of converting fuel and air to produce electricity without combustion. In SOFCs, the barrier layer (the "electrolyte") between the fuel and the air is a ceramic layer, which allows oxygen atoms to migrate through the layer to complete a chemical reaction. Because ceramic is a poor conductor of oxygen atoms at room temperature, the fuel cell is operated at 700° C. to 1000° C., and the ceramic layer is made as thin as possible.

Early SOFCs were produced by the Westinghouse Corporation using long, fairly large diameter, extruded tubes of zirconia ceramic. Typical tube lengths were several feet long, with tube diameters ranging from ¼ inch to ½ inch. A complete structure for a fuel cell typically contained roughly ten tubes. Over time, researchers and industry groups settled on a formula for the zirconia ceramic which contains 3 mol % $Y_2O_3$. This material is made by, among others, Tosoh of Japan as product TZ-3Y.

Another method of making SOFCs makes use of flat plates of zirconia, stacked together with other anodes and cathodes, to achieve the fuel cell structure. Compared to the tall, narrow devices envisioned by Westinghouse, these flat plate structures can be cube shaped, 6 to 8 inches on an edge, with a clamping mechanism to hold the entire stack together.

A still newer method envisions using larger quantities of small diameter tubes having very thin walls. The use of thin walled ceramic is important in SOFCs because the transfer rate of oxygen ions is limited by distance and temperature; if a thinner layer of zirconia is used then the final device can be operated at a lower temperature while maintaining the same efficiency. Literature describes the need to make ceramic tubes at 150 $\mu$m or less wall thickness. These new thin-wall tubes will be seen to be the subject of the present invention.

Extrusion is the most common method for making ceramic tubes. In this approach, ceramic particles are mixed with an organic binder, often a waxy material, and the material is pressed through a circular opening. The problems with this method include (i) maintaining straightness during the firing process, (ii) obtaining thin walls with no defects, and (iii) preventing sagging of the circular cross-section into an oval shape.

Numerous patents describe methods of improving the manufacture of extruded thin-wall ceramic tubes. Continuous firing in an attempt to create long tubes has been described in U.S. Pat. No. 5,227,105. Sands, et al., describe in U.S. Pat. No. 4,395,231 the rotation of a tubular furnace as the tubular devices are passed through, whereby the speed going into the sintering furnace is faster than the speed coming out of the furnace so as to account for the shrinkage of the ceramic. In U.S. Pat. No. 4,770,631, Hell, et al., describe a method of hanging tubes vertically during sintering. In U.S. Pat. No. 5,935,513, Martreuil, et al. describe firing a ceramic tube inside of a larger ceramic support tube. Other patents, including U.S. Pat. No. 4,579,707 to Kobayashi, et al., describe methods of improving the stiffness of the un-fired tube by using a thermosetting organic binder, and then applying heat immediately after extrusion.

In efforts to make small, thin walled tubes, the extrusion process faces several challenges. One is that the tubes can warp or twist during binder removal. This problem may be due to the fact that the binders commonly used for extrusion do not maintain their strength throughout the binder removal process before sintering. Another problem relates to the production of the thin walls themselves. At a thickness of 150 $\mu$m or less, a fairly small defect, such as an air bubble or a binder inclusion, can cause a defect in the final tube, creating a leak that would be considered catastrophic in a SOFC. Another practical problem with extruding thin walled tubes is that they are mechanically weaker than a thicker tube, which makes mounting difficult.

Henrik Raeder of the Center for Industrial Research in Norway has described the use of tape cast ceramics for making thin walled tubes. Tape casting involves evenly coating a horizontal surface with a ceramic slurry, drying, then removing the dried film. The slurry is prepared by dispersing ceramic in an organic binder, often a mixture of polyvinyl butyryl in solvent. Raeder described using 8 to 20 mm wide strips of tape, and winding them around alumina or glass rods. The wrapped material had an overlap of 1 to 3 mm. The diameter of the rods was 2 to 6 mm. After forming the tubes, they were slipped off the ends of the rods. Except in the areas of the seam, these tube walls were one thickness of cast ceramic, and they had trouble maintaining perfect circular form.

Two methods were used by Raeder to seal the tube along the wrapped seam. One was based on applying ethanol to the seam, which dissolved the binder and made it stick to the next layer. Another method was to apply thinned slurry to the seam, which had the advantage of both sealing the seam and coating it with additional ceramic.

SUMMARY OF THE INVENTION

The present invention contemplates a new process of fabricating thin walled ceramic tubes, particularly as are useful in Solid Oxide Fuel Cells (SOFCs). The thin-wall ceramic tubes are strong during binder removal, straight during and after firing, and of high quality without defects. The laminated thin-walled ceramic tubes are suitable for use in, among other things, fuel cells.

The preferred process of the present invention begins with very thin cast ceramic tape, preferably from 10 $\mu$m to 50 $\mu$m, and more preferably approximately 12 $\mu$m in thickness. The tape is wrapped around a mandrel, most commonly and preferably made of steel, with enough wraps to reach the desired thickness of a tube wall. To make a ceramic tube of approximate 100 $\mu$m wall thickness, approximately 10 layers of 12 $\mu$m tape are around the mandrel; the resulting 120

µm tube will shrink to about 100 µm wall thickness during sintering. To make this thin-walled ceramic tube approximately 15 cm. in length—which is common length—one can either start with a 15 cm. wide ceramic sheet and wrap it directly around the mandrel, or start with a much longer and narrower strip of ceramic tape, wrapping the tape continuously around the mandrel in a spiral pattern to attain the desired width (tube length) and thickness.

The green ceramic tube is then laminated in a pressure laminator, preferably a hydrostatic laminator where high pressure water from, most normally, 3000 to 5000 psi is applied so as to forcibly adhere the organic binder of each ceramic layer to the next. Pressure lamination (i) links the polymer chains between each ceramic layer, (ii) cross-links the polymer chains within each ceramic layer, and, importantly, (iii) fully densifies the ceramic laminate structure by removing any air and reducing porosity.

A challenge with this "laid up", or "lamination", approach is that a laminated tube will tend to stick to the mandrel after the lamination process. To solve this problem, it is preferred to make use of a coating on the mandrel, such as, most preferably, a wax. The mandrel is prepared for the tube making operation by dipping the mandrel into hot wax (or rubbing a cold wax stick onto a heated mandrel), and then letting it cool. The coated mandrel, with its solidified coating, becomes the core of the green ceramic tube. After lamination the green tube is stuck to the mandrel, but can be removed by heating the mandrel above the melting point of the wax. Even a thin coating of wax will become liquid and will then permit the tube to be removed easily. A variation of this process would be to make the mandrel completely out of wax, but that can have the disadvantage of making it difficult to maintain tube straightness. Other materials can prospectively be used to accomplish the wax coating on the mandrel, including an ice/water combination, but are not believed to be as convenient as wax.

The advantages of the method of the present invention are numerous: a ceramic tube made of thin cast tape layers will have a maximum defect size equal to the thickness of the tape, meaning that thin walled tubes can be made with very high quality. The preferred lamination process using a preferred polyvinyl butyryl binder (PVB) produces a tube of high rigidity because the high lamination pressures (i) cross links the tape, (ii) links polymer chains between lamination layers, and (iii) removes any air—thus reducing porosity and increasing density—compared to the characteristics of a soft and un-laminated PVB tape. The green ceramic tube, once removed from the mandrel, will not sag during bakeout and can even be fired on a flat surface.

Further in accordance with the method of the present invention, it is easy to create usefully different thicknesses along the length of the tube. This is particularly useful in providing increased thickness, and strength, to the ends of a very thin tube, at which ends the tube is held for mounting. For example, a tube of desirably thin 50 µm average wall thickness might prove to be very fragile for normal mounting in a solid oxide fuel cell. However, if additional tape is wrapped at the ends of the tube, say in the last 1 centimeter at each end so as to there increase the wall thickness to several hundred microns, then the tube may be held and mounted with increased reliability, and with increased resistance to breakage. Thickening of the tube ends generally serves to make ever-thinner-walled tubes mechanically practical.

A variation on this concept of selective reinforcement of the thin-wall tube is to wrap additional material down the length of the tube, and in selected areas, as a strength-enhancing and stress-absorbing binding in order to improve the burst and/or break strength of the tube (without gross effect on oxygen migration through remaining thin-walled regions of the tube). For example, a strip of green ceramic material of many tens of centimeters length can be produced from green tape that has a 50 µm×50 µm section. This strip can be wrapped around the tube like as the hoops of a barrel or, preferably, in a spiral, or helix. If desired, yet another piece can be wrapped around the tube, normally in a spiral or helix of opposite handedness. These top wrap(s) give added strength to the final, fired, tube.

Still yet another feature of the ceramic tube manufacturing method of the present invention is that a varied internal form can quite readily be imparted to the tube, particularly so as to create turbulence within the tube. The method of constructing thin-walled ceramic tubes with complex internal features preferably starts with a solid mandrel that has been machined or otherwise shaped so as to create a channel down the length of the mandrel, preferably a spiral channel for all or most of the length of the tube which will be formed upon the mandrel. After the mandrel is coated with wax, a ceramic green tape is wound around the mandrel and laminated. After lamination, the tube is heated and the removed from the mandrel (and vice versa). If the mandrel's channel is a spiral (or helical) channel, as is preferred, then the tube may be turned in the manner of a nut on a threaded screw as it is backed off the mandrel. At least the inner layers of the tape wrap will penetrate into the spiral channel of the mandrel, giving a three-dimensional form inside the tube which will serve as a partial baffle to the flow of gases longitudinally through the tube, desirably increasing turbulence in this gas flow.

The net advantage of these further improvements is to give improved strength and toughness to the thinnest of ceramic tubes, thus making possible high-efficiency, reliable and strong thin-wall ceramic tubes eminently suitable for use in a solid oxide fuel cell (SOFC). Meanwhile, automated manufacturability of the tube is retained, and tubes of usefully complex contours both external and internal may be readily and inexpensive made.

In particular, the optionally thicker tube ends permit even very thin tubes to be better and more reliably mounted into the larger mating pieces. Integral wraps or windings down the exterior length of the tube give better mechanical strength to the tube itself, while maintaining the thin walls of the tube over most of its area. Finally, features created in the interior of the tube induce turbulence in the gas flow longitudinally within the tube.

1. A Method of Making a Ceramic Tube

Accordingly, in one of its aspects the present invention is embodied in a method of making a ceramic tube of wall thickness $T_{tube}$.

The method consists of (i) wrapping green ceramic, having a thickness $T_{wrap}$ that thinner than is the thickness $T_{tube}$ of the tube, around a mandrel a multiple n times, (ii) laminating together the n wraps of the green ceramic under pressure while still wrapped about the mandrel; and then, in either sequence, both (iii) separating the mandrel from the laminated wraps, and (iv) sintering the separated laminated wraps to produce a laminated ceramic tube of wall thickness $n \times T_{wrap} = T_{tube}$.

The wrapping is preferably to a cumulative wall thickness $T_{tube}$ that is less than 1 millimeter, and that is still more preferably less than 100 micrometers. Ergo the method serves to make a thin-walled ceramic tube.

The wrapped green ceramic is preferably ceramic tape which is preferably wound around the mandrel in a spiral pattern. This preferred green ceramic tape is more preferably wound around the mandrel in spirals of complimentary right-hand, and left-hand, twist, one wound layer to the next.

The wrapped green ceramic tape is preferably of a width $W_{tape}$ less than 0.20 the length $T_{length}$ of the ceramic tube that is made from laminated layers of the tape. The tape is therefor wound about the mandrel at least 1/0.2=5 times so as to form each single thickness, tube end to tube end, of each wound layer.

Likewise, the wrapped green ceramic tape is preferably of a thickness $T_{wrap}=T_{tape}$ less than 0.20 the thickness $T_{tube}$ of the ceramic tube that is made from laminated layers of the tape. The resulting ceramic tube of n layers thus has at least 1/0.2=5 laminate layers.

The green ceramic may alternatively be ceramic sheet, which ceramic sheet is preferably wound radially around the mandrel in equal area sheets with each sheet substantially aligned with and continued from an earlier sheet.

In this case the wrapped green ceramic sheet is preferably of a width $W_{sheet}$ equal to a length $T_{length}$ of the ceramic tube made from laminated layers of the tape. Each sheet is therefor wound straight around the mandrel to form a single thickness of each wrap.

Likewise in this case, the wrapped green ceramic sheet is preferably of a thickness $T_{sheet}$ less than 0.20 the thickness $T_{tube}$ of the ceramic tube made from laminated layers of the sheet. The resulting ceramic tube of n layers thus again has at least 1/0.2=5 laminate layers.

The basic method may, after the wrapping but before the laminating, optionally further include a further wrapping upon the laminate layers of the tube of at least one extra winding. This extra winding is coextensive with the body of the tube as would be a wrap layer, but is rather wrapped around the tube in the manner of a rope binding, thereby to add structural strength to the tube.

This optional further wrapping may in particular be of plural spiral, or helical, windings of ceramic tape in complimentary left-hand and right-hand spirals. This optional further wrapping may also be at end regions of the tube only, and not at the central region of the tube. When the end region(s) is (are) thickly wrapped, then the central region of the tube is thinner, being of thickness $T_{tube}$, then is are this (these) end area(s) of the tube where exist(s) additional thickness of the ceramic tape.

These optionally thickened tube end regions may be derived from 1) wraps having greater thickness $T_{wrap}$ as are selectively applied to end regions of the tube, or else from 2) wraps of substantially equal thickness $T_{wrap}$ are applied to a greater number of layers n at end regions of the tube, or from both wraps types 1) and 2), so that the wrapped laminated tube is not of equal thickness, but is thicker at end regions.

The tube may optionally have internal features, or baffles. Namely, the method may be performed using a mandrel having one or more grooves, or channels. The grooves may be circumferential, but are preferably in spiral, or helical, form. The wrapping is then of successive wraps at least the interior ones of which wraps pull tight into the spiral groove(s) of the mandrel, producing after the sintering a laminate ceramic tube having a interior bore in which is present one or more grooves in the manner of the rifling of a rifle barrel. As a variation, the mandrel, and the resulting tube, may spiral grooves that are (i) intertwined, being both of a right-hand or both of a left hand type, or that are (ii) intersecting, being of both right- and left-hand types.

The green ceramic preferably contains a cross-linkable organic binder. The laminating together under pressure then consists of laminating in a hydrostatic pressure laminator. The pressure of the laminator and the laminating is sufficient to cross-link the organic binder within the ceramic of each layer, forming linked polymer molecular chains between layers.

In the most preferred method, a releasing agent, preferably wax, is placed on the surface of the mandrel before the applying of the green ceramic tape wrap. The separating of the mandrel from the laminated wrapped tape then consists of activating the releasing agent on the surface of the mandrel (such as by heating the wax until it melts), and withdrawing the mandrel from the laminated wrapped layers of ceramic.

The invention includes both laminate ceramic tubes, and thin-walled laminate tubes particularly sized, adapted and suitable for use in fuel cells, that are produced by this method.

2. Thin-walled Laminate Ceramic Tubes with Integral Features

In another of its aspects the present invention is embodied in laminated thin-walled ceramic tubes having particular, integral, features that are not know by the inventors to have been present in the prior art.

In one embodiment the thin-walled ceramic tube has at its exterior surface an integral ceramic wrap or winding which serves to strengthen the tube against bursting and breakage while permitting that a majority of the exterior surface of the tube is neither wrapped nor wound, and in these regions the tube maintains its relatively thinner walls. This ceramic wrap or winding is preferably in one or more spirals along the length of the tube, or in a number of intersecting clockwise and counter-clockwise spirals. The external appearance of the tube is thus similar in appearance to the leg windings of a roman sandal, or the intertwined snakes of a caduceus.

In another, complimentary, embodiment the laminated thin-wall ceramic tube has at its ends increased integral thickness of ceramic. This thickness serves to strengthen the tube against end damage during mounting of the tube to any external structure at, and by, the tube's end regions.

In still another, further complimentary, embodiment, the laminated thin-wall ceramic tube has at its interior surface an integral feature, or baffle, that serves to induce turbulence in any longitudinal flow of gases within, and along the length of, the tube. This integral interior surface feature is preferably a spiral channel along the length of the tube.

3. A Complete Fuel Cell Reaction Chamber Based on a Thin-walled Laminate Ceramic Tube In yet another of its aspects the laminated thin-walled ceramic tubes may be used in combination as a complete reaction chamber of a fuel cell.

In the preferred method of making a tubular reaction chamber of a fuel cell from concentric ceramic tubes, lengths of thin planar green ceramic—either sheet or, more preferably, tape, are prepared both (i) plain and with (ii) a metallization layer upon one surface.

One or more turns of first thin planar green ceramic having a metallization surface are first wrapped around a mandrel sufficiently contiguously and extensively so as to form an uninterrupted first tubular surface.

Then one or more turns of thin planar plain green ceramic surface are second wrapped around the mandrel over the first thin planar green ceramic. This second wrapping is again sufficiently contiguous and extensive so as to form an uninterrupted tubular surface—a second tubular surface.

Then one or more turns of third thin planar green ceramic having a metallization surface are third wrapped around the mandrel over the second thin planar green ceramic. This third wrapping is also sufficiently contiguous and extensive so as to again form an uninterrupted, third, tubular surface.

The first and the second and the third wrappings of green ceramic as do form the first and the second and the third tubular surfaces are then laminated together under pressure while these wrappings are still wrapped about the mandrel.

Subsequently, the mandrel is separated from the laminated wraps, and the laminated wraps sintered to produce three laminated concentric ceramic tubes each of the tubes is itself laminated.

In the composite structure the innermost first tube—being of the first thin planar ceramic having a metallization surface—is within a next, second, tube—being of the second thin planar plain ceramic—is within a next, third and outermost, tube—being of the third thin planar ceramic having a metallization surface. The metallization of one of the innermost first and the outermost third tube is suitably an anode, while the metallization of the other tube is suitably a cathode of a reaction chamber of a fuel cell. The second tube is suitably the electrolyte of this fuel cell reaction chamber.

Accordingly, a tubular reaction chamber of a fuel cell has been formed from concentric ceramic tubes each of which tubes is laminated, and where the entire tubular reaction chamber is laminated.

The first wrapping is preferably of one or more turns of first thin planar green ceramic having its metallization surface to the exterior, and away from the mandrel, while the third wrapping is preferably of one or more turns of third thin planar green ceramic having its metallization surface to the interior, and towards the mandrel.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

Figure 1A:
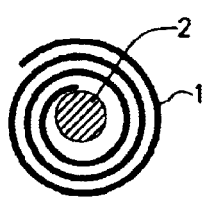
FIG. 1, consisting of FIGS. 1a through 1c, is a diagrammatic perspective view showing the steps of wrapping, laminating, and removing of the mandrel in the thin-wall laminated ceramic tube fabrication method of the present invention.
Figures 1B, 1C:
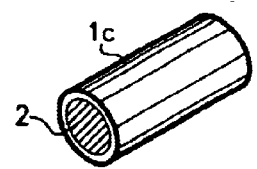

FIG. 1, consisting of FIGS. 1a through 1c, diagrammatically illustrates the principle steps of the preferred method of the present invention for the fabrication of thin-wall laminated ceramic tubes. A green ceramic tape, or sheet, is shown wrapped about a typically cylindrical mandrel in FIG. 1a.

The step of laminating the wrapped green ceramic—previously applied in the step of FIG. 1a—is illustrated in FIG. 1b.

Finally, the removing of the mandrel, leaving a thin-wall laminated ceramic tube, is illustrated in FIG. 1c.

Figure 2A:
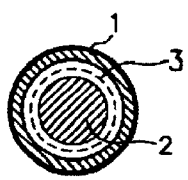
FIG. 2, consisting of FIGS. 2a and 2b, is an end, and a side perspective, view of mandrel to which a releasing agent, normally wax, has been applied in accordance with one optional, but highly preferred, step of the thin-wall laminated ceramic tube fabrication method of the present invention.
Figure 2B:
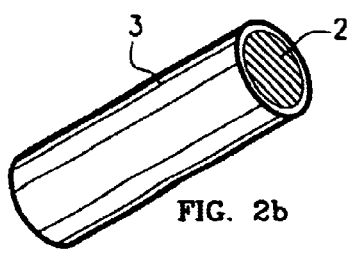

Removal of the mandrel 2 is optionally, but preferably, aided and abetted by a releasing agent that is applied even before the wrapping step of FIG. 1a. This is illustrated in FIG. 2, where FIG. 2b shows a mandrel 2 covered with a releasing agent 3; normally wax applied by coating or dipping when hot followed by a subsequent cooling. FIG. 2a—which is similar to FIG. 1a—shows the wrapping of the green ceramic tape, or sheet, 2 about a mandrel 2 having a releasing agent 3 upon its surface.

An end, and a side perspective, view of mandrel to which a releasing agent, normally wax, has been applied are respectively shown in FIGS. 2a and 2b. Application of the releasing agent 3 is optional, but highly preferred, in the thin-wall laminated ceramic tube fabrication method of the present invention.

Figure 3A:
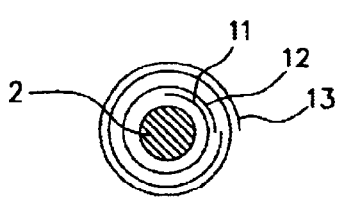
FIG. 3, consisting of FIGS. 3a and 3b, is an end, and a side perspective, view of an extension of the method of the present invention to produce both a fuel cell reaction chamber having both anodes and cathodes with an electrolyte between them.
Figure 3B:
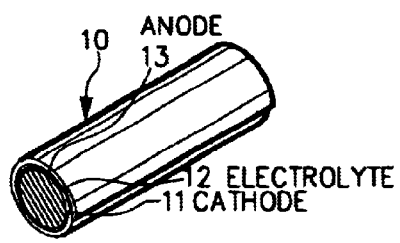

FIG. 3, consisting of FIGS. 3a and 3b, shows an end, and a side perspective, view of an extension of the method of the present invention to produce both a fuel cell reaction chamber having both anodes and cathodes with an electrolyte between them. The wrapping of the mandrel 2 with each of a first, second and third ceramic wrap (each of which wraps may itself consist of plural wrappings) is illustrated in FIG. 3a. The completed fuel cell rod 10 with cathode 11, electrolyte 12 and anode 13 is shown in FIG. 3b.

All the wraps, which become the functional layers of cathode 11, electrolyte 12 and anode 13, are sufficiently contiguous and extensive so as to first form uninterrupted tubular surfaces and then, after sintering, uninterrupted tubes. Although each tubular cathode 11, electrolyte 12 and anode 13 is itself integral and whole, it is not necessary that each tube be gas tight to the next and, indeed, there may even be slight longitudinal cavities between the tubes as support the longitudinal flow of gases. Only the green ceramic, and ultimately the tubular cathode 11 and tubular anode 13, are possessed of a metallization layer. Normally, and preferably, the metallization layer of the green ceramic forming the tubular cathode 11 is disposed outwardly, and way from the mandrel 2—although this is not essential. The metallization layer of the green ceramic forming the tubular cathode 13 is likewise preferably disposed inwardly, and towards the mandrel 2—although this also is not essential. The green ceramic forming the tubular electrolyte 12 is entirely ceramic. The tubular electrolyte 12 is porous to the penetration of gases, namely oxygen, and is thus properly called an electrolyte.

In operation within a fuel cell, the tubular fuel cell reaction chamber of FIG. 3 formed from laminated tubes receives fuel and oxygen-containing air, and functions to catalyze a reaction between the fuel and the air.

Figure 4:
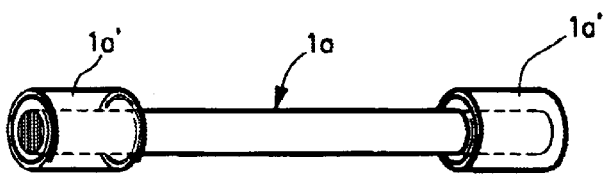
FIG. 4 is a diagrammatic perspective view of a variant embodiment of a thin-wall laminated ceramic tube in accordance with the present invention having thickened end regions.

A diagrammatic perspective view of a variant embodiment of a thin-wall laminated ceramic tube 1a in accordance with the present invention is shown in FIG. 4. The tube 1a has one or two thickened end regions 1a1 that are formed either from (i) wrappings of ceramic sheet or tape that are, at this (these) region(s) (only) of increased thickness, or, as is preferred, from (ii) additional wrappings of ceramic sheet or tape (exclusively) in the end regions of the tube 1a. The thickened end regions 1a1 make the tube less susceptible to end damage, and to breaking, during mounting at its ends.

Figure 5A:
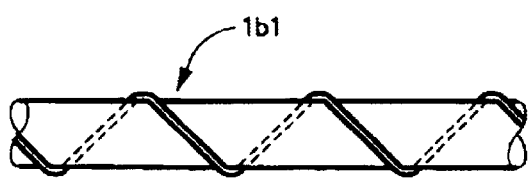
FIG. 5, consisting of FIGS. 5a and 5b, is a diagrammatic perspective view of variant embodiments of a thin-wall laminated ceramic tube in accordance with the present invention respectively having single, and double, spiral, or helical, external wrappings, or windings.
Figure 5B:
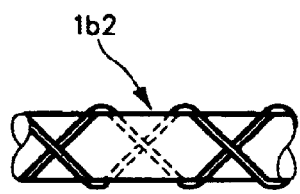

A diagrammatic perspective view of a variant embodiment of a thin-wall laminated ceramic tubes 1b1, 1b2 in accordance with the present invention respectively having single spiral, or helical, external wrapping, or winding are respectively shown in FIGS. 5a and 5b. The variant embodiment of the thin-wall laminated ceramic tube in accordance with the present invention having double, opposite-handedness, spiral, or helical, external wrappings, or windings that is shown in FIG. 5b.

Figure 6:
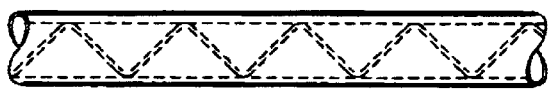
FIG. 6 is a diagrammatic perspective view of a variant embodiment of a thin-wall laminated ceramic tube in accordance with the present invention having an internal spiral, or helical, groove in the manner of the rifling of a rifle barrel.

A diagrammatic perspective view of a variant embodiment of a thin-wall laminated ceramic tube in accordance with the present invention having an internal spiral, or helical, groove (in the manner of the rifling of a rifle barrel) is shown in FIG. 6.

In accordance with the preceding explanation, variations and adaptations of the process for making thin-walled ceramic tubes in accordance with the present invention will suggest themselves to a practitioner of the ceramic arts. For example, the green ceramic 30 could be wrapped about an inflatable mandrel which was withdrawn by deflating. For example, the mandrel could incorporate an electrical heating element so as to sinter the ceramic with which it is wound without benefit of an oven. For example, the ceramic tubes could be used for other purposes than fuel cells. Provided with periodic holes in the manner of a garden sprinkler hose, sealed tubes containing medicine could be used for the infusion of the contained medication into the bodies and/or blood streams of animals into which the tubes were placed. For example, mounting tabs, flanges, and other features can be quite easily provided.

In accordance with these and other possible variations and adaptations of the present invention, the scope of the invention should be determined in accordance with the following claims, only, and not solely in accordance with that embodiment within which the invention has been taught.

What is claimed is:

1. A method of making a ceramic tube of wall thickness $T_{tube}$ comprising:

wrapping green ceramic tape, having a thickness $T_{wrap}$ that thinner than is the thickness $T_{tube}$ of the tube, around a mandrel in spiral of complimentary right-hand and left-hand twist one wound layer to the next a multiple n times;

laminating together the n wraps of the green ceramic under pressure while still wrapped about the mandrel; and, in either sequence, both separating the mandrel from the laminated wraps; and sintering the laminated wraps to produce a laminated ceramic tube of wall thickness $n \times T_{wrap} = T_{tube}$.

2. The method according to claim 1 wherein the wrapped green ceramic tape is of a width $W_{tape}$ less than 0.20 the length $T_{length}$ of the ceramic tube made from laminated layers of the tape;

wherein the tape is therefor wound about the mandrel at least $1/0.2=5$ times so as to form each single thickness, tube end to tube end, of each wound layer.

3. The method according to claim 1, wherein the wrapped green ceramic tape is of a thickness $T_{wrap} = T_{tape}$ less than 0.20 the thickness $T_{tube}$ of the ceramic tube made from laminated layers of the tape, making that the resulting ceramic tube of n layers has at least $1/0.2=5$ laminate layers.

4. The method according to claim 1, wherein the wrapped green ceramic tape is of a thickness $T_{sheet}$ less than 0.20 the thickness $T_{tube}$ of the ceramic tube made from laminated layers of the tape, making that the resulting ceramic tube of n layers has at least $1/0.2=5$ laminate layers.

5. A method of making a ceramic tube of wall thickness $T_{tube}$ comprising:

first wrapping green ceramic, having a thickness $T_{wrap}$ that thinner than is the thickness $T_{tube}$ of the tube, around a mandrel a multiple n times to form a plurality of wrap layers at least some of which are coextensive with the body of the tube;

further, second, overwrapping upon an outermost laminate wrap layer at least one extra winding of green ceramic tape not so as to form another wrapped layer substantially coextensive with the body of the tube but rather so as to form an overwrap in the manner of a rope binding, therein to add structural strength to the tube.

laminating together the n wraps of the green ceramic and the at least one extra overwrapped winding of green ceramic tape under pressure while still wrapped about the mandrel; and, in either sequence, both separating the mandrel from the laminated wraps and at least one overwrap; and sintering the laminated wraps and the at least one overwrap to produce a laminated ceramic tube of wall thickness $n \times T_{wrap} = T_{tube}$.

6. A method of making a ceramic tube of wall thickness $T_{tube}$ comprising:

wrapping green ceramic, having a thickness $T_{wrap}$ that thinner than is the thickness $T_{tube}$ of the tube, around a mandrel a multiple n times;

further overwrapping plural windings of ceramic tape in complimentary left-hand and right-hand spirals at end regions of the tube only, and not at a central region of the tube;

wherein a central region of the tube is thinner, being of thickness $T_{tube}$, then is are end areas of the tube where exist the windings of spirally-wrapped ceramic tape;

laminating together the n wraps of the green ceramic and plural overwrapped windings under pressure while still wrapped about the mandrel; and, in either sequence, both separating the mandrel from the laminated wraps and plural overwrapped windings; and sintering together the laminated wraps and plural overwrapped windings to produce a laminated ceramic tube of wall thickness $n \times T_{wrap} = T_{tube}$ which tube is thickened at its ends.

7. A method of making a ceramic tube of varying wall thickness comprising:

wrapping green ceramic, having a thickness that is thinner than is a thickness of the tube, around a mandrel a multiple n times;

wherein the wrapping is of 1) wraps having greater thickness as are applied to end regions of the tube, or else 2) wraps of substantially equal thickness are applied to a greater number of layers at end regions of the tube, or both wraps 1) and 2), so that the wrapped laminated tube is not of equal thickness, but is thicker at end regions;

laminating together the wraps of the green ceramic under pressure while still wrapped about the mandrel; and, in either sequence, both separating the mandrel from the laminated wraps; and sintering together the laminated wraps to produce a laminated ceramic tube which is thickened at its ends.

8. A method of making a ceramic tube of varying wall thickness performed with a mandrel having a spiral groove; the method comprising:

wrapping green ceramic, having a thickness that is thinner than is a thickness of the tube, around the mandrel having a spiral groove a multiple n times;

wherein the wrapping is of successive wraps at least the interior ones of which pull tight into the spiral groove of the mandrel;

laminating together the wraps of the green ceramic under pressure while still wrapped about the mandrel; and, in either sequence, both separating the mandrel from the laminated wraps; and sintering together the laminated wraps so as to produce after the sintering a laminate ceramic tube having a interior bore in which is present a groove in the manner of a topological inverse of the rifling of a rifle barrel.

9. The method according to claim 8, performed with a mandrel having a plurality of intertwined spiral grooves wherein the wrapping is of successive wraps at least the interior ones of which pull tight into the plurality of intertwined spiral grooves of the mandrel, producing after the sintering a ceramic tube having an interior bore with a plurality of intertwined grooves in the manner of a topological inverse of the rifling of a rifle barrel.

10. The method according to claims 1, 5, 6, 7, or 8, wherein the green ceramic contains a cross-linkable organic binder, and wherein the laminating together under pressure comprises:

laminating in a hydrostatic pressure laminator;

wherein pressure of the laminator and the laminating is sufficient to cross-link the organic binder within the ceramic of each layer, forming linked polymer molecular chains between layers.

11. The method according to claims 1, 5, 6, 7, or 8, that, before the wrapping, further comprises:

placing a releasing agent on the surface of the mandrel; and wherein the separating of the mandrel from the laminated wrapped tape comprises:

activating the releasing agent on the surface of the mandrel; and withdrawing the mandrel from the laminated wrapped layers of ceramic.

12. The method according to claims 1, 5, 6, 7, or 8 that, before the wrapping, further comprises:

placing a releasing agent on the surface of the mandrel by applying wax to the surface of the mandrel;

and wherein the separating of the mandrel from the laminated wrapped tape comprises:

activating the releasing agent on the surface of the mandrel by melting the wax; and withdrawing the mandrel from the laminated wrapped layers of ceramic.

13. A method of making a tubular reaction chamber of a fuel cell from concentric ceramic tubes, the method comprising:

preparing lengths of thin planar green ceramic both (i) plain and with (ii) a metallization layer upon one surface;

first wrapping one or more turns of first thin planar green ceramic having a metallization surface around a mandrel sufficiently contiguously and extensively so as to form an uninterrupted first tubular surface; then second wrapping one or more turns of thin planar plain green ceramic surface around the mandrel over the first thin planar green ceramic sufficiently contiguously and extensively so as to form an uninterrupted second tubular surface; then third wrapping one or more turns of third thin planar green ceramic having a metallization surface around a mandrel sufficiently contiguously and extensively so as to form an uninterrupted third tubular surface; then laminating together under pressure the first and the second and the third wrappings of green ceramic as do form the first and the second and the third tubular surfaces while these wrappings are still wrapped about the mandrel; and then, in either sequence, both separating the mandrel from the laminated wraps; and sintering the laminated wraps to produce a three concentric ceramic tubes laminated together where each of the tubes is itself laminated, a innermost first tube being of the first thin planar ceramic having a metallization surface, and next, second, tube being of the second thin planar plain ceramic, and the next, third and outermost, tube being of the third thin planar ceramic having a metallization surface;

where the metallization of one of the innermost first and the outermost third tube is suitably an anode, while the metallization of the other tube of the first and the third tubes is suitably a cathode, while the second tube is suitably an electrolyte, of a reaction chamber of a fuel cell;

wherein a tubular reaction chamber of a fuel cell has been formed from concentric ceramic tubes each of which tubes is laminated, and which entire tubular reaction chamber is laminated.

14. A method according to claim 13, wherein the first wrapping is of one or more turns of first thin planar green ceramic having its metallization surface to the exterior, and away from the mandrel; and wherein the third wrapping is of one or more turns of third thin planar green ceramic having its metallization surface to the interior, and towards the mandrel.

* * * * *